G. G. MOORAJ.
WIND SCREEN FOR VEHICLES.
APPLICATION FILED MAY 13, 1912.
1,086,201.
Patented Feb. 3, 1914.
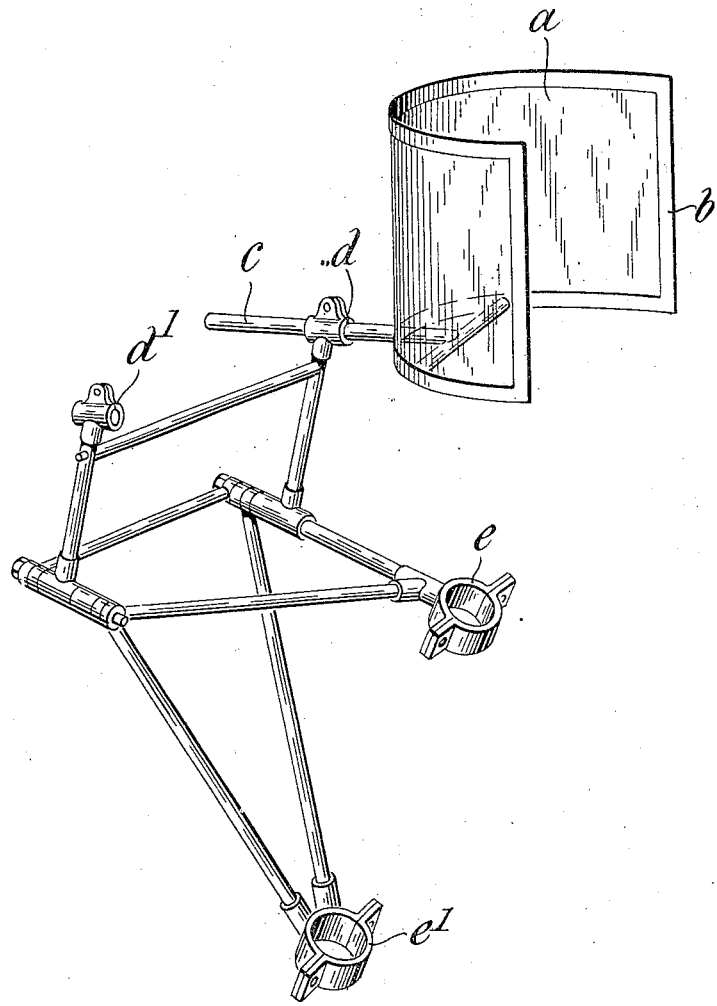

UNITED STATES PATENT OFFICE.

GULAMALI GULAMHUSEIN MOORAJ, OF BOMBAY, INDIA.

WIND-SCREEN FOR VEHICLES.

1,086,201.

Specification of Letters Patent.

Patented Feb. 3, 1914.

Application filed May 13, 1912. Serial No. 696,944.

*To all whom it may concern:*

Be it known that I, GULAMALI GULAMHUSEIN MOORAJ, a subject of the Emperor of India, residing in Bombay, India, have invented certain new and useful Wind-Screens for Vehicles, of which the following is a specification.

The object of this invention is to provide a shelter for the head and face of the driver or other occupant of a motor-car or other vehicle that shall protect him against driving rain, dust, flying insects and other inconveniences of this class.

The apparatus according to this invention comprises a curved screen of celluloid or other transparent material suspended in front of the driver's head and of a size just sufficient to give full protection to the face and eyes, and which, in case of accident, shall not expose him to the danger which a large screen of glass causes when broken by any sudden shock.

A construction according to this invention is shown on the accompanying drawing in which the apparatus is attached to the steering post of an automobile and arranged in front of the driver's face.

A sheet of celluloid $a$, is held in a metallic frame $b$, carried on the stem $c$. The stem $c$ is held in a light frame having two split collars $e$ and $e'$ that clamp around the steering post. An extension of the frame carries a socket $d'$, which can receive a second screen for the protection of the person sitting next the driver. The screen can be fixed as shown, attached to the front framing, or suspended from the roof or roof stanchions as may be found convenient.

One important advantage of this guard is that when blurred by driving rain, the driver may without moving from his seat, look beyond it on either side. Under ordinary circumstances it also dispenses with the use of goggles and it may be tinted to reduce sun glare.

What I claim as my invention and desire to secure by Letters Patent is:—

In a road vehicle, a frame, means to clamp the frame rigidly to the steering post of the vehicle, a curved transparent screen, a stem connected to said screen, two clamping sockets on the frame in either of which the stem can be inserted and adjusted nearer to or farther from the face of the occupant of the vehicle.

In testimony whereof I have signed my name to this specification in the presence of two subscribing witnesses.

GULAMALI GULAMHUSEIN MOORAJ.

Witnesses:
 JEHANGIR M. RUTNAGUR,
 HILDA V. LYNCH.